(12) United States Patent
Schlake et al.

(10) Patent No.: US 10,994,223 B2
(45) Date of Patent: May 4, 2021

(54) SINGLE PHASE HIGH PRESSURE LIQUEFIED GAS CHROMATOGRAPHY SYSTEM AND METHOD

(71) Applicant: Applied Separations, Inc., Allentown, PA (US)

(72) Inventors: Rolf Schlake, Nazareth, PA (US); Alfred Kaziunas, Bangor, PA (US); Matthew Fuchs, Allentown, PA (US)

(73) Assignee: APPLIED SEPARATIONS, INC.

( * ) Notice: Subject to any disclaimer, the term of this patent is extended or adjusted under 35 U.S.C. 154(b) by 185 days.

(21) Appl. No.: 15/992,799

(22) Filed: May 30, 2018

(65) Prior Publication Data
US 2018/0345175 A1    Dec. 6, 2018

Related U.S. Application Data

(60) Provisional application No. 62/512,259, filed on May 30, 2017.

(51) Int. Cl.
*B01D 15/40* (2006.01)
*B01D 15/16* (2006.01)
(Continued)

(52) U.S. Cl.
CPC .......... *B01D 15/40* (2013.01); *B01D 15/163* (2013.01); *B01J 20/22* (2013.01); *G01N 30/02* (2013.01); *B01J 2220/54* (2013.01)

(58) Field of Classification Search
CPC ................................ D06B 23/10; G01N 21/25
See application file for complete search history.

(56) References Cited

U.S. PATENT DOCUMENTS 5,322,626 A * 6/1994 Frank .................. B01D 11/0203
203/49
5,561,066 A * 10/1996 Sinha .................. G01N 33/1813
436/161

(Continued)

OTHER PUBLICATIONS

Wells et al., "Unified Chromatography with CO2-Based Binary Mobile Phases, Exploring chromatographic schemes involving binary mobile phases with CO2", Analytical Chemistry, University of Mississippi, Jan. 1, 2003, pp. 18A-24A. US.

*Primary Examiner* — Ryan B Huang
(74) *Attorney, Agent, or Firm* — The Belles Group, P.C.

(57) ABSTRACT

A liquid chromatography system and method utilizes a mobile phase comprising liquified compressible gas and miscible organic solvents. The compressible fluid may be carbon dioxide (CO2). Liquid CO2 tapped from an existing source is depressurized through a flow control metering station before adding solvent. The mobile phase flows through a sample vessel containing analytes and chromatography column for sample separation. A back pressure regulator maintains a set elution pressure in the chromatography column. CO2 advantageously remains in liquid phase for elution in the column, thereby avoiding two-phase conditions adversely affecting analyte resolution. An equilibration bypass flow loop may be provided to separate normal sample elution from initial CO2 flow equilibration, thereby allowing rapid exchange of samples with minimal downtime. System CO2 pressures less than 100 bar and room temperature may be used during the process, thereby obviating the need for high pressure pumps and chillers of supercritical fluid chromatography.

18 Claims, 6 Drawing Sheets

(51) Int. Cl.
    *G01N 30/02*     (2006.01)
    *B01J 20/22*     (2006.01)

(56) References Cited

U.S. PATENT DOCUMENTS

| | | | |
|---|---|---|---|
| 8,293,111 B2 | 10/2012 | Thurbide | |
| 2015/0040992 A1* | 2/2015 | Shreve | G01N 30/02 |
| | | | 137/14 |
| 2017/0173496 A1* | 6/2017 | Stone | B01D 15/305 |
| 2017/0276654 A1* | 9/2017 | Goto | B01D 19/00 |

* cited by examiner

SINGLE PHASE HIGH PRESSURE LIQUEFIED GAS CHROMATOGRAPHY SYSTEM AND METHOD

CROSS-REFERENCE TO RELATED APPLICATIONS

The present application claims the benefit of U.S. Provisional Application No. 62/512,259 filed May 30, 2017, the entirety of which is incorporated herein by reference.

BACKGROUND OF THE DISCLOSURE

The present disclosure generally relates to chromatography, and more particularly to a liquid chromatographic separation system and process for separating an analyte (chemical compound or substance of interest) from a sample using a liquified gas which remains as a single phase liquid for the chromatographic elution.

Chromatography has been widely used for the separation of mixtures containing an analyte substance or chemical constituent (hereafter "compound(s)" for brevity) of interest. Conventional liquid chromatography separations use both polar and non-polar organic solvents such as methanol, ethanol, and hexane as a mobile phase in conjunction with a chromatographic stationary phase. Disposal of these used solvents as toxic wastes is expensive and this is not an environmentally friendly "green" technology.

One alternative chromatography method is to use SFC (Supercritical Fluid Chromatography) that eliminates much of the solvent by using compressible carbon dioxide ("$CO_2$") to carry the solvent. SFC Chromatography is advantageous over conventional HPLC described below because the analysis times are decreased and better chromatographic separations can be achieved. But these systems are typically complex and expensive from a cost of ownership standpoint because of the high pressure $CO_2$ pumps (needed to elevate the pressure of and pump supercritical fluids) and chillers. FIG. 1 depicts a conventional SFC system showing the chiller and high pressure $CO_2$ pump. Such SFC systems also typically require operation by specially trained operating personnel due to their complexity.

Completely miscible organic solvent mobile phases are the norm for high performance liquid chromatography (HPLC) and phase separation into a liquid and a separate gas phase which adversely affects chromatographic separation performance is not a problem. Such systems typically use incompressible miscible combinations of water with various organic solvents or solvents alone. This is not the case when a liquid organic solvent or combination of organic solvents is added to compressible $CO_2$ to form a binary chromatographic mobile phase such as in SFC systems. The major problem is that under certain conditions of temperature, pressure, and solvent concentration, some of these binary mobile phases split into two phases (a gas and a separate liquid phase) when not wanted, such as in the chromatographic column. A mobile phase composed of separate gas and liquid phases changes the phase distribution equilibria of the sample compounds in the chromatographic column and affects the resolution of the compounds. These two phase gas/liquid binary systems are complicated and their phase behavior can demonstrate unusual interactions between the components of the mobile phase and common chromatographic stationary phases that are in the chromatography column. In fact it has been shown that some of the mobile phase becomes part of the stationary phase and the new stationary phase is in dynamic equilibrium with the mobile phase. Unfortunately, this means that the changing properties of a gradient in the mobile phase will lead to a changing stationary phase typically in a non linear fashion. This results in erratic, nonlinear and non-reproducible chromatography, and problems during chromatography scale-up from laboratory bench-type experimental setups to regular full scale chromatographic separation applications.

An improved chromatography process is desired.

SUMMARY OF THE DISCLOSURE

A chromatography system and related method which uses a liquefied compressible gas along with a miscible co-solvent are disclosed for separating a sample which overcomes the shortcomings of the foregoing prior separation approaches. Advantageously, the present system provides reliable scalability and good chromatographic separation performance while providing an environmentally "green" alternative to traditional chromatography via using liquid $CO_2$ as the mobile phase or carrier. The present chromatography system further provides a more cost-effective green approach than higher cost SFC (supercritical fluid chromatography) system by eliminating the need for high-pressure $CO_2$ pumps and cooling systems.

In one embodiment, the chromatography process according to the present disclosure utilizes a binary mobile phase comprised of a miscible single phase of liquid $CO_2$ and organic solvent to achieve separation of the analytes (i.e. chemical substances or compounds of interest) from a sample. The liquified gas may be mixed with any miscible liquid organic solvent that forms a single liquid mobile phase for conducting the chromatographic sample separation without detrimentally splitting into separate gas and liquid phases during the chromatographic separation. In one non-limiting example of representative liquid mobile phase conditions of about 65 bar pressure at the chromatography vessel and ambient room temperatures less than the critical temperature of $CO_2$ and solvent (e.g. below 31 degrees C./87.8 degrees F.), it has been discovered that the organic solvents typically used in gradient elution chromatography are miscible and advantageously form a single phase with liquid $CO_2$ for the entire possible range of $CO_2$ concentrations from 0 to 100% in the mobile phase that might be encountered without the adverse effects of liquid and gas separation. In stark contrast, this miscibility is not always the case when organic solvents are mixed with $CO_2$ in the supercritical state such as in SFC, which then results in poorer chromatographic separation.

In one implementation according to the present disclosure, liquified $CO_2$ gas from an existing liquified compressible gas supply source may simply be tapped and used without further compression and pressurization at a desired flow rate controlled by a flow controller which combines functions of a metering valve, a flow meter, and valve controller in a single device for controlling the metering valve position or opening percentage to regulate flow of the liquid mobile phase. The elution pressure in the chromatography column or vessel is controlled by a preferably automated or optionally manual heated back pressure regulator (BPR) located downstream of and at the discharge from the chromatography vessel. These flow and pressure control stations control the flow and pressure of the liquid mobile phase, thereby advantageously eliminating the need for expensive high pressure mobile phase pumps, chillers, and other related equipment and appurtenances associated with supercritical fluid chromatography (SFC). For example, liquified $CO_2$ tapped from an existing laboratory or other type processing facility "house" liquid CO2 supply line at 80 bar may be reduced to a target lower pressure using the BPR located downstream of the separation or chromatography vessel, and mixed with a miscible organic solvent to form a completely miscible mobile phase at approximately 65 bar pressure or other suitable pressure below 80 bar and room temperature as described herein. A preset flowrate of liquid CO2 or gradient flow during the course of the elution may be used.

In one embodiment, the flowrate of liquid CO2 may be automatically regulated and controlled by a programmable logic controller, which may control some or all aspects of the chromatography process as further described herein. The controller uses actual real-time operating flow data transmitted by and received from the flowmeter of the flow controller to continually and automatically adjust the liquid CO2 flow control metering valve to achieve the desired setpoint or baseline flowrate of the liquid mobile phase. The baseline flowrate(s) may therefore be preprogrammed into the controller which is operably and communicably coupled to the flow controller for controlling the position of the flow controller flow control metering valve (e.g. open percentage) via the valve controller/operator. For a given chromatographic separation sequence, a fixed or gradient flowrate of liquid CO2 may be selected and implemented by the programmable controller based on the chromatographic conditions, nature of the substance(s) to be separated, and solvent used in order to provide good separation performance based on the given process parameters.

In some embodiments, the BPR setpoint may also be controlled by the programmable controller to automatically maintain a preprogrammed back pressure in the chromatography vessel during the elution process. Other components such as the solvent pump and other process equipment of the chromatographic system may be controlled by the programmable controller as further described herein.

During operation of the liquid chromatography system, certain configurations of the present system advantageously allows the modified liquid mobile phase (i.e. CO2 and organic solvent mixture) to be initially bypassed around the sample vessel (containing the sample with analyte(s) of interest) and flow directly into the chromatography vessel using an automated switching or selector valve for initially equilibrating the system before separation of the analytes. The selector valve operation may be automatically controlled in some embodiments by the programmable controller. In the liquid mobile phase bypass mode of operation, the mobile phase passes through the chromatography column or vessel until the mobile phase pressure, and flow are equilibrated. After equilibration, the position of the selector valve may be automatically changed by the controller to redirect the liquid mobile phase flow through the sample vessel and then subsequently to the chromatography vessel for sample separation when the controller determines that the foregoing actual operating parameters meet corresponding preprogrammed baseline values. After the sample analytes are separated which completes a first processing run of the system, the mobile phase may be redirected again by the controller to bypass the sample vessel and flow directly through the chromatography vessel as described above. This setup advantageously allows rapid venting and replacement of the spent sample with the next one for a second processing run simultaneously while the system is equilibrating the chromatography column.

In one embodiment, a method for separating a sample using high pressure single-phase liquified-gas chromatography includes: tapping a source of liquified compressible gas at an available first pressure to form a liquid mobile phase; flowing the liquid mobile phase through a flow controller comprising an adjustable flow control metering valve, a flowmeter and a valve operator or controller for controlling the flow rate by percent opening of the metering valve using a programmable controller operably coupled to the flow controller; mixing a miscible liquid organic solvent with the liquified gas mobile phase to form a modified liquid mobile phase; incorporating an analyte(s) of interest into the modified liquid mobile phase; eluting the modified liquid mobile phase through a chromatography vessel containing an adsorption material operable to separate the analyte(s) from the liquid mobile phase; maintaining the preselected lower second pressure in the chromatography vessel during elution via the controller automatically adjusting a back pressure regulator downstream of the chromatography vessel, the liquified compressible gas and miscible organic solvent in the liquid mobile phase existing as a single phase liquid in the chromatography vessel during the elution; heating the liquid mobile phase containing the separated analyte to separate the liquified compressible gas from the liquid mobile phase containing the separated analyte in a first gas-liquid separator (GLS) which separates most of the compressible gas from the organic solvent; additional removal of small amount of the dissolved or carried over compressible gas from the organic solvent in a mini gas-liquid separator and collecting the separated analyte(s). The incorporation of a mini-gas-liquid separator is unique and has been found by the inventors to improve the collection of the separated analytes as manifested by the elimination of periodic flow spurts caused by the presence of residual compressible gas coming along with the organic solvent and the separated analyte(s).

Embodiments of the system and process according to the present disclosure may be used in analytical, semi-preparative, preparative and flash chromatography in which replaceable prepacked sorbent cartridges are used for the elution in lieu of hand packing sorbent in the chromatographic separation vessel or column.

According to one aspect of the disclosure, a method for separating a sample using single-phase high pressure liquified gas chromatography is provided. The method comprises: tapping a source of liquified compressible gas at an available first pressure to form a liquid mobile phase; flowing the liquid mobile phase through a flow controller configured for regulating a flowrate of the liquid mobile phase; measuring a real-time flowrate of the liquid mobile phase through the flow controller using a flowmeter; controlling the flowrate of the liquid gas mobile phase through the flow controller with a programmable controller based on the controller sensing the real-time flowrate measured by the flowmeter; mixing a miscible liquid organic solvent with the liquid mobile phase to form a modified liquid mobile phase existing as a single phase liquid; incorporating analytes of interest into the modified liquid mobile phase; eluting the modified liquid mobile phase through a chromatography vessel containing an adsorption material operable to separate the analytes from the liquid mobile phase; maintaining a preselected minimum second pressure in the chromatography vessel during elution preprogrammed into the controller to prevent separation of the modified liquid mobile phase into mixed liquid and gas phases in the chromatographic vessel, the controller automatically adjusting a back pressure regulator downstream of the chromatography vessel to maintain the minimum second pressure; heating the modified liquid mobile phase containing the separated analytes to separate the liquified compressible gas from the liquid organic solvent containing the separated analytes, the modified liquid mobile phase comprising a volumetric majority of gas and a lesser volumetric minority of liquid comprising the organic solvent and a residual amount of the liquid mobile phase in the form of dissolved gas; separating the gas from the liquid in a first gas-liquid separator; and collecting the separated analytes along with the liquid organic solvent.

According to another aspect of the disclosure, a method for separating a sample using high pressure liquid chromatography with a liquefied gas mobile phase is provided. The method comprises: tapping a source of compressed liquefied gas at an available first pressure to form a liquid mobile phase; flowing the liquid mobile phase through an automated flow controller at a programmable controlled flow rate; mixing a miscible liquid organic solvent at a programmable controlled flow rate with the liquid mobile phase to form a modified liquid mobile phase existing in a single liquid phase; incorporating a sample containing a mixture of analytes into the modified liquid mobile phase; eluting the modified liquid mobile phase and sample through a chromatography vessel containing an adsorption material to separate the analytes from each other in the sample; maintaining a programmable minimum second pressure of the modified liquid mobile phase in the chromatography vessel during elution via an automated back pressure regulator downstream of the chromatography vessel, the minimum second pressure being lower than the first pressure and selected to maintain a preselected flowrate of the modified liquid mobile phase through the chromatography vessel while also maintaining the modified liquid mobile phase in the miscible complete liquid state; heating the modified liquid mobile phase containing the separated analytes in order to separate the liquefied gas from the liquid organic solvent containing the separated analytes in a first gas-liquid separator; additionally removing and venting residual dissolved gas from the liquid organic solvent in a second gas-liquid separator; and collecting the separated analytes along with the liquid organic solvent in multiple collection chambers.

According to another aspect of the disclosure, a single-phase high pressure liquified gas chromatography system is provided. The system comprises: a compressed liquified gas source containing a compressed liquid defining a liquid mobile phase at an available first pressure; a flow controller fluidly coupled to the liquified compressed gas source, the flow controller comprising a flow control valve, valve operator operable to control a position of the valve, and a flowmeter, the flow controller operable to measure and regulate a real-time flowrate of the liquid mobile phase; an organic solvent pump configured to inject a miscible organic solvent into the liquid mobile phase via a mixing element, the miscible liquid organic solvent and liquid mobile phase defining a single phase modified liquid mobile phase; a sample vessel fluidly coupled to the mixing element, the sample vessel including a sample containing analytes dissolvable in the liquid mobile phase; a chromatography vessel fluidly coupled to the sample vessel and receiving the liquid mobile phase from the sample vessel which contains the analytes, the chromatography vessel containing a stationary phase adsorption material; an adjustable back pressure regulator fluidly coupled to an outlet of the chromatography vessel, the back pressure regulator operable to measure and regulate a real-time back pressure on the chromatography vessel to maintain a minimum elution pressure therein; a gas-liquid separator fluidly coupled to the back pressure regulator and operable to separate the liquified gas from the organic liquid mobile phase; a collector fluidly coupled to a liquid drain outlet of the gas-liquid separator; and a collector operable to collect the analytes; and a programmable controller operably coupled to the flow controller and back pressure regulator. The controller is configured and operable to: receive the real-time flowrate and real-time back pressure from the flow controller and back pressure regulator, respectively; compare the real-time flowrate against a preselected setpoint flowrate operating preprogrammed into the controller; automatically adjust the flow controller to maintain the setpoint flowrate; compare the real-time back pressure against a preselected setpoint minimum back pressure preprogrammed into the controller; and automatically adjust the back pressure regulator to maintain the minimum back pressure on the chromatography vessel. The controller simultaneously controls the flow control metering valve and back pressure regulator in tandem to maintain the liquid mobile phase composed of a liquified gas and miscible organic solvent as a single phase liquid.

In one embodiment, the system further comprises an equilibration bypass system including: a three-way selector valve fluidly coupled to and between the mixing element, sample vessel, and chromatography vessel; and a bypass flow conduit fluidly coupled directly between the chromatography vessel and the selector valve in a primary flowpath of the liquid mobile phase, the bypass configured and operable to isolate the sample vessel from the primary flowpath; wherein when the selector valve is in a first operating position, the liquid mobile phase bypasses the sample vessel and flows directly from the mixing element into the chromatography vessel for initial equilibration of the system; and wherein when the selector valve is in a second position, the liquid mobile phase flows through the sample vessel and into the chromatography vessel for sample separation.

BRIEF DESCRIPTION OF THE DRAWINGS

The features of the exemplary embodiments will be described with reference to the following drawings where like elements are labeled similarly, and in which.

Figure 1:
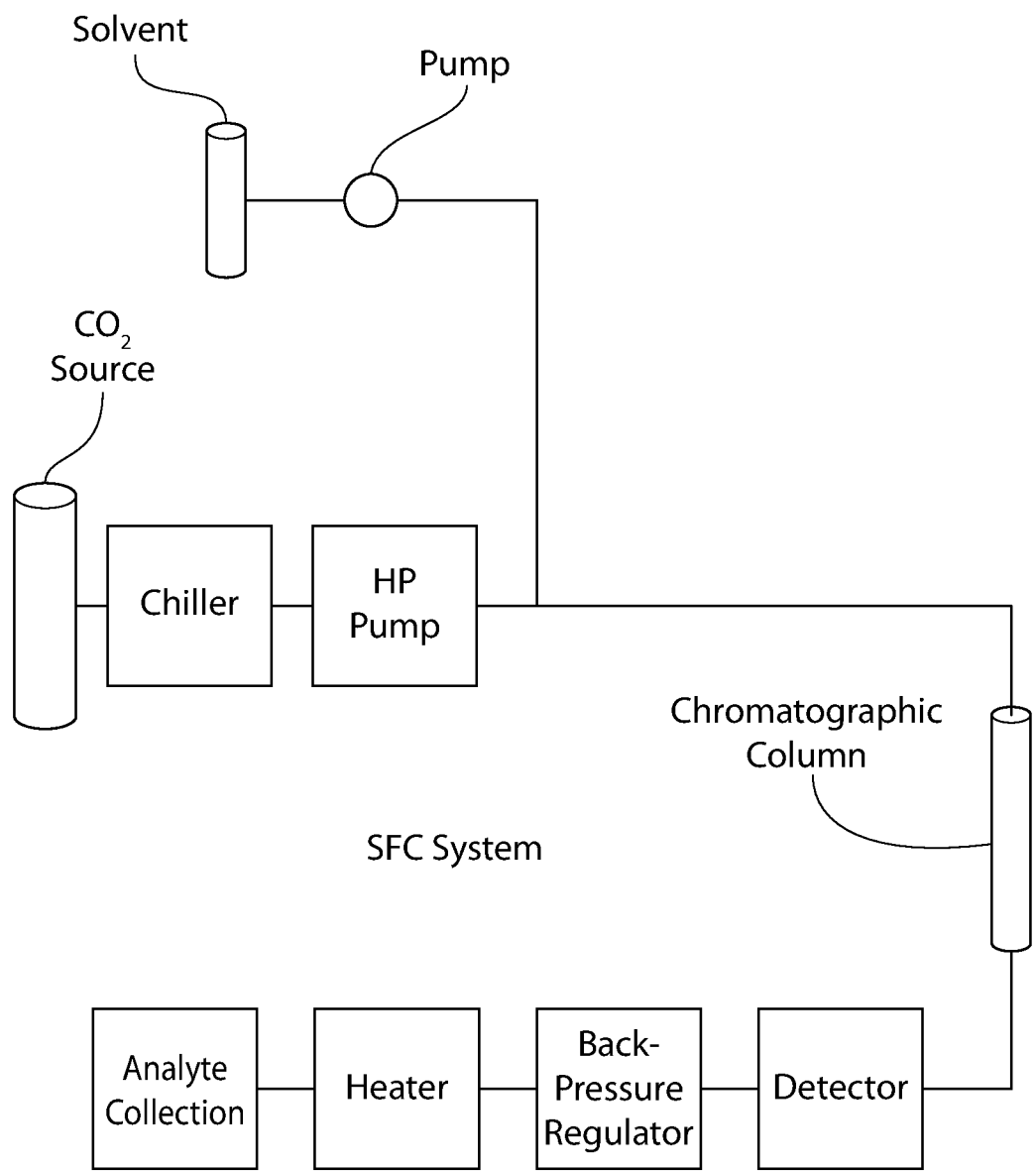
FIG. 1 is a schematic system and flow diagram of a conventional SFC (supercritical fluid chromatography) system.

All drawings are schematic and not necessarily to scale.

DESCRIPTION OF EXEMPLARY EMBODIMENTS

The features and benefits of the invention are illustrated and described herein by reference to exemplary embodiments. This description of exemplary embodiments is intended to be read in connection with the accompanying drawings, which are to be considered part of the entire written description. In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," and "interconnected," refer to a relationship wherein structures are secured or attached to one another either directly or indirectly through intervening structures, as well as both movable or rigid attachments or relationships, unless expressly described otherwise. Accordingly, the disclosure expressly should not be limited to such exemplary embodiments illustrating some possible non-limiting combination of features that may exist alone or in other combinations of features.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

The terms "software," "program instructions," or "control logic" as may be used interchangeably herein, includes but are not limited to, one or more computer instructions and/or processor instructions that can be read, interpreted, compiled, and/or executed by a programmable computer or processor (e.g. controller). Software causes a computer, processor, or other electronic device to perform functions, actions and/or behave in a desired manner. Software may be embodied in various forms including routines, algorithms, modules, methods, and/or programs. In different examples software may be embodied in separate applications and/or code from dynamically linked libraries. In different examples, software may be implemented in executable and/or loadable forms including, but not limited to, a stand-alone program, an object, a function (local and/or remote), a servelet, an applet, instructions stored in a memory, part of an operating system, and so on. In different examples, computer-readable and/or executable instructions may be located in one processing logic and/or distributed between multiple communicating, co-operating, and/or parallel processing logics and thus may be loaded and/or executed in serial, parallel, massively parallel and other manners. Software or program instructions are fixed in a non-transitory computer/processor readable tangible medium.

The inventors have discovered at typical ambient room temperatures and operating pressures below those required for SFC chromatography systems that liquid CO2 is completely miscible with typical chromatographic organic solvents for use as a single phase liquid mobile phase or carrier that surprisingly provides excellent chromatographic separation results. Advantageously, the chromatography system according to the present disclosure therefore does not require expensive high pressure CO2 pumps, interventional coolers to cool the mobile phase, or high design pressure vessels needed for high pressure SFC chromatography separation processes in order to obtain good separation performance. In addition, it has been found that organic solvent usage may beneficially be reduced by at least 10% and possibly greater than 90% or more in comparison to traditional liquid chromatography. This reduces the amount of toxic solvent waste generated which must be disposed.

It has also been advantageously discovered that the separation of the compressible gas from the organic solvent may be carried out in two stages in two separate gas-liquid separators (GLS). The first GLS separates the bulk of the gas compressible from the organic solvent; this separator contains mostly gas and a small amount of the organic solvent along with the separated analytes. The vaporized compressible gas liquid is continuously removed as a gas from a first port which has a restrictor which increases the pressure in the first GLS and minimizes loss of the entrained organic solvent and analytes with the vaporized gas. The organic solvent containing the separated analytes is removed continuously from a second port of the first GLS. The organic solvent may contain a small amount of residual entrained and dissolved gas. This is now passed through a small or mini-GLS which separates the small amount of gas from the liquid and operates very close to atmosphere pressure. The pressures, flow rates and compositions of the of the mobile phase can vary in the chromatography depending on the species being separated in the column. It may not be possible to achieve complete separation of compressible gas from the organic solvent in the first GLS under varying flow, pressure and solvent composition conditions. In addition, the volume of the first GLS is relatively large to accommodate the large volume of gas created by the conversion of the liquefied gas at high pressure into gas a much lower pressure. A restrictor may be added to the exit port through which the gas leaves to minimize loss of the organic solvent and the analytes. The restrictor causes the pressure to increase in the first GLS. The second GLS is much smaller in volume than the first GLS since it receives mostly the organic solvent and the analytes along with a small amount of dissolved and entrained gas in the organic solvent. This GLS is integrated into the sample collection exit which operates at close to atmospheric pressure. This allows one to remove additional gas from the organic solvent. This eliminates periodic sputtering and bubbling in the flow of the solvent into the collection system and allows smooth collection of the separated analytes in the collection chambers/vials in the collection system.

Figure 2:
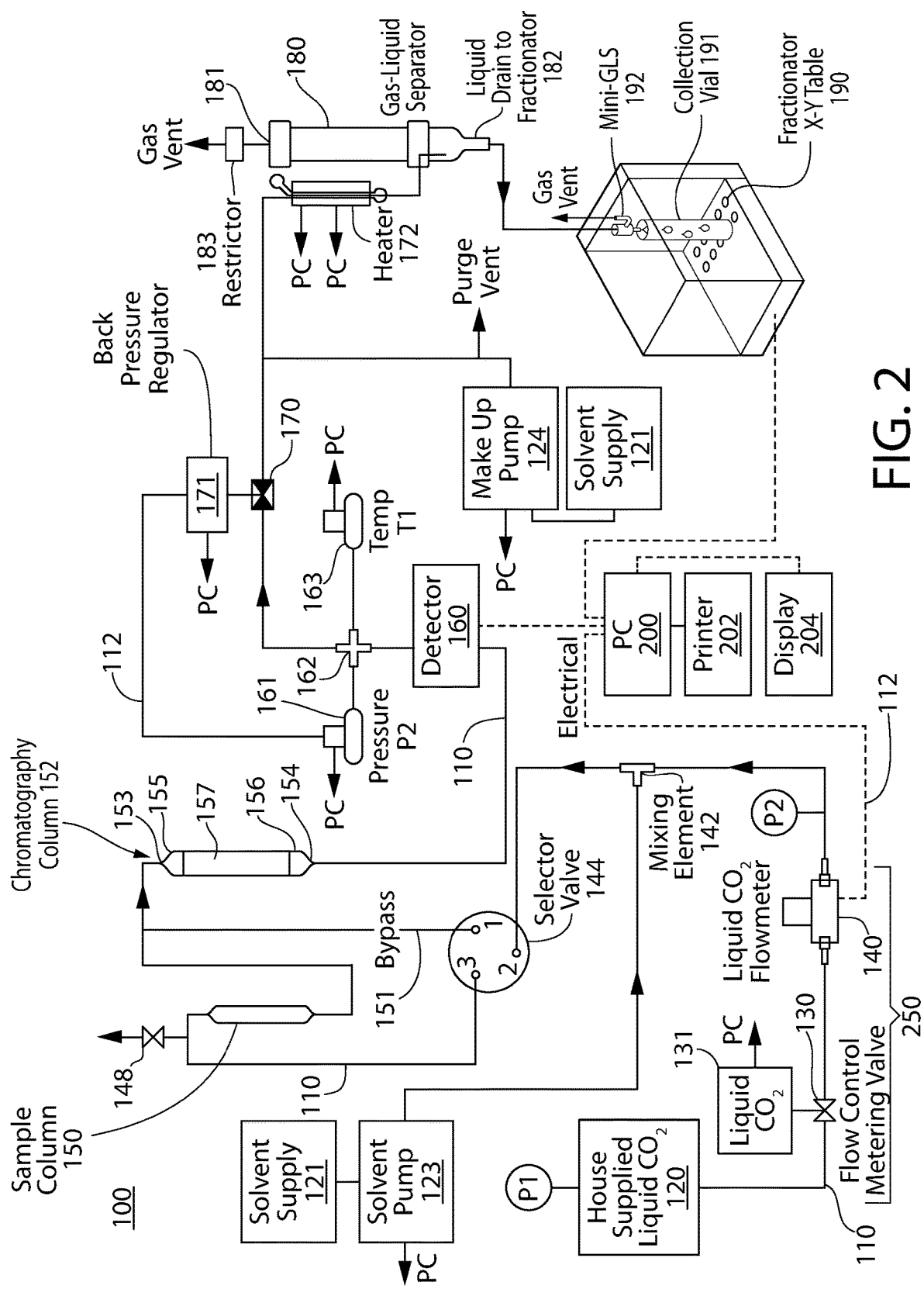
FIG. 2 is a schematic system and flow diagram of an embodiment of a compressible liquid chromatography system according to the present disclosure.

FIG. 2 depicts one non-limiting embodiment of a single phase liquid CO2 chromatography system 100 and process flow diagram according to the present disclosure. All equipment of chromatography system 100 further described herein and shown in FIG. 2 should be construed to be fluidly connected by a suitable flow conduit 110 where shown in this schematic flow diagram by the connecting lines and arrows indicating a principal flow direction (but not necessarily an exclusive flow direction). Every flow conduit 110 shown is not labeled in FIG. 2 to reduce clutter, but should be so assumed. The flow conduits 110 may be any suitable pressure containment flow conduit such as tubing and/or piping of an appropriate size, configuration, wall thickness, and material to handle the temperature, pressure and particular material or fluid being conveyed through the conduit. In one non-limiting embodiment, the flow conduit may be stainless steel tubing. It is understood that any appropriate type and size of fittings or connectors (e.g. threaded, welded, brazed, soldered, compression fittings, etc.) and seals may also be used to fluidly couple the components and flow conduits together although not specifically enumerated herein.

Referring now to FIG. 2, an available source 120 of liquid CO2 is provided for use by system 100. In some embodiments, the source may be a laboratory or pharmaceutical processing facility "house supply" flow distribution network containing compressed liquid CO2 at standardly available house supply line pressures. Such single source liquid CO2 house supply lines may be fluidly tapped by a multitude of different process stations in the facility requiring CO2. A typical liquid CO2 house supply line pressure may be for example, without limitation, about 80 bar. Other house liquid CO2 supply pressures are of course possible.

The liquid CO2 source 120 is tapped and fluidly coupled to the flow controller 250 (aka flow control metering station) of the present system. The flow controller 250 may be an integrated device comprising an automatically adjustable inlet flow control metering valve 130, valve controller/operator 131 operably to control position of the valve 130 (i.e. open percentage or fully closed position), and flowmeter 140 downstream of the valve which is used to control the valve position by programmable controller 200 to create the desired liquid CO2 flow rate for the elution. Any suitable type of commercially available flow controller 250 which integrates the valve, operator, and flowmeter in a single device preferably configured for automated operation by a programmable controller may be used. In other embodiments, a separate flow metering valve 130 with valve operator 131 and flowmeter 140 may be used. The pressure on the discharge side of the metering valve 130 is at a lower pressure than the inlet side of the valve. Metering valve 130 is operable to regulate the liquified gas flow to a suitable chromatographic process flow rate for conducting the elution and separation of the intended analyte of interest from the sample carried by the mobile phase, as further described herein. Pressure P2 therefore needs to be sufficiently lower than the CO2 source supply pressure P1 in order to establish flow since there are no pumps for pressurizing the CO2 in the chromatography system of the present invention.

The selected chromatography CO2 pressure P2 for chromatography system 100 is also preferably higher than the vapor pressure of CO2 at the operating temperature to avoid forming gaseous CO2 in order to maintain the binary mobile phase comprising the liquified CO2 and miscible organic solvent as a single phase liquid during sample elution, thereby avoiding the possible chromatographic separation problems of SFC systems associated with splitting of the mobile phase into gaseous and liquid states which is detrimental to chromatographic performance. In one embodiment, the liquid CO2 process elution or back pressure P2 in the chromatography column or vessel 152 set by the BPR 170 preferably has a minimum value above 60 bar, which at ambient room temperatures of T1 below the critical temperature of CO2 (i.e. 31 degrees C./87.8 degrees F.) ensures that the CO2 remains as a single phase liquid. In one non-limiting example at a house CO2 source supply pressure of 80 bar and a desired CO2 flow rate of 60 ml/minute for rapid analyte separation in the chromatographic vessel, a chromatographic process pressure P2 of about 65 bar was found to maintain the mobile phase of the CO2 and organic solvent as a single phase liquid during elution and produced good separation performance in an actual trial. Other pressures P2 may of course be used based on the actual configuration of the chromatography process configuration, equipment sizes, and intended mobile phase flow rates so long as the pressure is sufficient to maintain the binary CO2-organic solvent liquid mobile phase as a single phase liquid in the chromatography column 152. In certain embodiments, the chromatographic process pressure P2 may be between 50 bar and 100 bar, and preferably between 50 bar and 80 bar.

The metering valve 130 and flowmeter 140 are each communicably and operably coupled to a processor-based programmable controller 200, as further described elsewhere herein. The controller 200 automatically adjusts the position of valve 130 (i.e. percent opened/closed) to produce the desired liquid CO2 flow rate of the system based on actual flow rate measurement data recorded and transmitted to the controller by flowmeter 140. The controller 200 thus adjusts the valve 130 based on the liquid mobile phase flow rate(s) preprogrammed into the controller by a user. The liquid CO2 flow rate may held constant or intentionally varied during the course of the elution for gradient-type CO2 feed based on preprogrammed values or gradients input into the controller 200. Gradient flow changes the flowrate of liquified CO2 during the course or time period of the chromatographic sample separation run, which may be based on gradient flow parameters preprogrammed into controller 200. For example, the liquified CO2 gradient flow may have a higher initial flowrate (e.g. 66 ml/min.) at the start of the sample elution which gradually or sharply reduces to a lower final flowrate (e.g. 36 ml/min.) towards the end of the elution (i.e. reverse or decreasing gradient flow). An opposite increasing gradient flow may be used if dictated by the sample processing parameters and types of analytes to be extracted from the sample if necessary.

Figure 3:
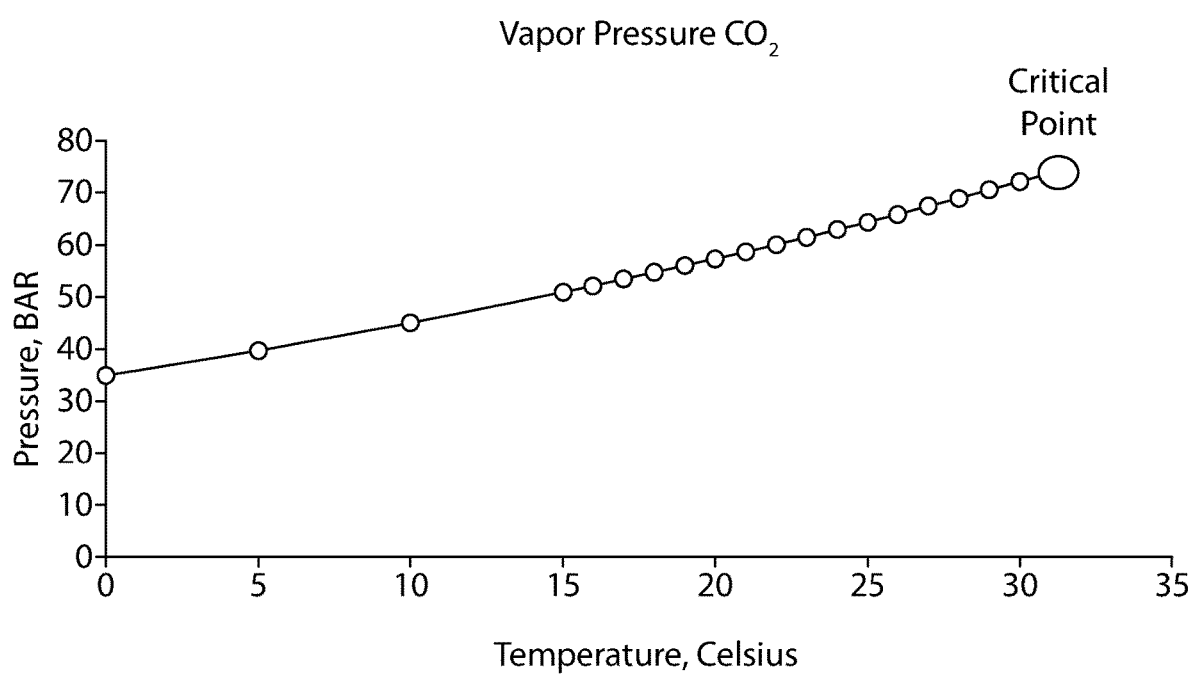
FIG. 3 is a vapor pressure graph for carbon dioxide.

The operating temperature T1 of the chromatography system liquid mobile phase is monitored to make sure T1 is below the critical temperature of both the liquid CO2 and organic solvent. FIG. 3 is a graph of the vapor pressure of CO2 at various temperatures and shows the critical point for CO2. The chromatography process according to the present disclosure advantageously may be conducted at ambient room temperatures of less than 31 degrees C./87.8 degrees F. which is the critical temperature of CO2. The temperature of organic solvents which may be used are preferably lower than their corresponding critical temperatures also. The solvent critical temperatures are typically higher and does not place upper bounds on the temperature limit. For example, the critical temperature of methanol which may be used in the present process is 240 degrees C./464 degrees F. Accordingly, the upper liquid mobile phase temperature limit of the present system is governed by the forgoing critical temperature of CO2.

The operational benefits of the present system can be readily explained with reference to the foregoing critical temperatures of the binary mobile phase constituents and system operating pressures. At approximately 65 bar and a temperature of 20 degrees C. (68 F) which is below the critical temperature of both CO2 and the method solvent used in one embodiment, the liquid CO2 is completely miscible with typical chromatographic organic solvents as a single phase over the entire range of possible CO2 concentrations from 0 to 100% in the liquid mobile phase that might possibly be encountered, thereby eliminating the problematic dual gas/liquid mobile phases and the consequent dynamic (changeable) stationary phase such as in SFC systems. Notably, both the CO2 and methanol advantageously are in liquid phase at pressures above approximately 65 bar. This is not the case with operating conditions encountered with SFC systems which employ a supercritical fluid mobile phase (of the compressible gas). For example, at elevated temperatures of 100 degrees C., above the critical temperature of CO2, but below the critical temperature of methanol, the binary liquid mobile phase is in a two phase state over virtually the entire range of CO2 concentrations that might be encountered in an SFC system. Such two phase mobile phases are associated with poorer chromatographic separation performance.

With continuing reference to FIG. 2 now, the single phase liquid CO2 then flows from the flow control metering valve 130 and flowmeter 140 to a flow mixing element or simply mixer 142 where it is combined with a preferable organic solvent from the solvent supply system. Mixer 142 is configured to provide satisfactory mixing of the separate inlet liquid CO2 and liquid solvent streams to create a combined mobile phase or carrier upstream of chromatographic separation pressure vessel or column 152. Any commercially available flow element suitable for the application may be used, including for example without limitation a static mixer or a mixing tee as illustrated in FIG. 2.

The liquid organic solvent supply system includes a solvent pump 123 that takes suction from and pumps the solvent from a solvent container 121 to flow mixing element 142. Solvent pump 123 is configured to allow the flowrate of solvent to be automatically varied by the controller 200 during the course of the sample elution. Controller 200 is communicably and operably connected to the solvent pump 123. Solvent pump 123 may be a metering pump in one embodiment thereby providing a controlled solvent flowrate regulated by the controller 200. In various embodiments, the solvent feed system may operate in an isocratic or gradient mode. In the isocratic operating mode, a constant flow of solvent is fed to mixer 142 by pump 123 over the entire course of the elution. This type solvent feed system is suitable where a single composition of mobile phase mixture (i.e. liquid CO2 and solvent) produces the desired separation of the compound or analyte of interest in the chromatography column 152.

The organic solvent may be any suitable polar or non-polar organic solvent or combination of solvents miscible with liquid CO2 and usable in chromatography separation that is capable of solubilizing another substance depending on whether the chromatography process is normal phase or reverse phase. In some embodiments, for example, typical solvents used may include without limitation methanol, ethanol, acetone, and hexane. The solvent selected will depend on the nature of the analytes to be separated from the sample in the chromatography column 152. Solvent concentrations used in the mobile phase may range for example without limitation from between about 1 volume percent to 100 volume percent in various embodiments.

Where the sample is complex and contains compounds or analytes that differ greatly in column retention times, a gradient solvent feed system may be used in which the concentration of organic solvent in the mobile phase liquid CO2 changes and increases over the course of the elution based on changing the solvent flowrate produced by solvent pump 123. The gradient solvent feed may be a linear gradient type feed or elution profile (i.e. constantly increasing concentration of solvent over the elution time having a smoothly sloped increasing profile), or step gradient type (i.e. increase of solvent concentration over the elution time having a stepped increasing profile). Both type gradient system are well known to and understood by those skilled in the art without further undue elaboration.

The organic solvent pump 123 in some embodiments may therefore be a gradient type pump configured and operable to pump solvent in either linear and/or step gradient operating modes. In some embodiments, pump 123 is configured and operable to pump solvent in both isocratic and gradient operating modes. Any suitable commercially-available chromatography solvent pump operable to deliver solvent at the desired pressure and manner (i.e. isocratic and/or gradient) to mixer 142 may be used. In one embodiment, the solvent pump 123 used may be a HPLC pump with stepper motor control to produce gradient solvent flow. Pumps of the plunger or piston type are also useable in this application for solvent pumps. The pump may be programmable for automatic operation or manually adjustable to achieve the desired gradient flow over time.

In some embodiments, a step profile gradient pump 123 having any suitable number of steps may be used. In one embodiment, a ten step-wise gradient solvent pump 123 may be used that incrementally increases the solvent flow to mixer 142 in stepped fashion while maintaining the overall volumetric flow of the combined solvent-liquid CO2 mobile phase flow to chromatography column 152.

Organic solvent pump 123 has an operating pressure range with a desired solvent flow capable of delivering solvent to the mixing element 142 at pressures higher than the pressure of liquid CO2 being introduced into the mixer to allow for injection and mixing of the solvent in the combined mobile phase stream. For example, if the liquid CO2 (mobile phase) process or elution pressure P2 is 65 bar, a pump 123 having an outlet pressure greater than 65 bar preferably is used.

The combined mobile phase comprised of liquid CO2 and organic solvent each in a single liquid phase flows to three-way valve 144 fluidly located between the flow mixer 142 and chromatography column 152. Suitable three-way valves include without limitation those available from Valco Instruments Company Incorporated of Houston Tex. or other manufacturers. In one embodiment, the inlet port 2 of the valve 144 is fluidly coupled to the outlet of the flow mixer 142 as shown in FIG. 2. One outlet port 3 is fluidly coupled to a sample column or vessel 150 via a normal flow conduit 110 which creates a normal flow path for the liquid mobile phase through the sample vessel for separating the sample in the chromatography vessel 152. Another outlet port 1 is fluidly coupled to a bypass flow conduit 151 configured to divert the combined CO2-organic solvent liquid mobile phase around the sample column directly to the chromatography column 152 for purposes of equilibrating the system, as further described herein. This creates a separate bypass flow path for equilibration. Selector valve 144 has two operational positions: (1) a first position in which the liquid mobile phase flows through the sample vessel and into the chromatography vessel for sample separation; and (2) a second operating position in which the liquid mobile phase bypasses the sample vessel and flows directly into the chromatography vessel for initial equilibration of the system. Operation of valve 144 and its operating configuration or position controlling which ports and flow paths through the valve are active (i.e. open) may be automatically selected and controlled by programmable controller 200. It bears noting that the outlet port associated with the flow path that is not active is closed and fluidly isolated by selector valve 144, and vice-versa (i.e. both outlet ports are not simultaneously open and or closed).

With continuing reference to FIG. 2, for normal process flow and active analyte separation, the mobile phase mixture of liquid CO2 and liquid solvent flows in the normal flow path from valve outlet port 3 through the sample vessel 150 containing a sample with analytes of interest. The sample is dissolved and incorporated into the liquid mobile phase. The liquid mobile phase with sample next flows directly from sample vessel 150 to chromatography column 152. It should be noted that there is not any intervening temperature or pressure modification of the liquid mobile phase between the CO2 source and chromatography column 152 in the present system. The liquid CO2 with a very low viscosity carries the solvent into the column 152 with the sample to undergo chromatographic separation.

Chromatography column 152 contains the pre-loaded stationary phase. Any suitable stationary phase material and sized particles may be used in the column and/or cartridges depending on the chemistry of the chromatography separation to be performed. In some embodiments, the stationary phase may be a C18 silica-based adsorbent or another suitable adsorption material such as alumina and others. In some embodiments, chiral phases are used. The invention is therefore not limited to use of any particular stationary phase material.

In one embodiment, the adsorption material has an overall particle size of about and including 5 to 100 microns. The particles may have any shape including without limitation irregular, angular, spherical, spheroid, and others. In some preferred embodiments, the overall particle size is between and including 10 to 50 microns depending on the shape of the particle since, for example, spherical particles will exhibit less pressure drop across a packed column relative to irregular (or angular) shaped particles. Preferably, in some embodiments, the particle size is at least about 10 microns to reduce pressure drop through the column if smaller particle sizes are used.

The sample column 150 and chromatography column 152 are generally cylindrically-shaped pressure vessels having an elongated tubular body structured and configured to withstand operating pressures contemplated between the column inlet 153 and outlet 154. To gain access to the interior cavity of column 152 for inserting and packing the stationary phase adsorbent material or inserting chromatographic cartridges, removable and sealable top and/or bottom end caps 155, 156 may be provided. The end caps may each be configured for connection to the flow conduit 110 and having openings formed therefore through that define the inlet and outlet. The inlet and outlet openings are suitably sized to pass the liquid mobile phase flow anticipated through the column. End caps 155, 156 may be coupled to the body by any suitable means, including without limitation threaded connections in some embodiments as shown. Seals such as O-rings may be provided to pressure seal the end caps to the column body. Sample vessel 150 may have a similar tubular construction to column 152 with at least one removable end cap for insertion and removal of the sample to be separated.

The cylindrical tubular body of column 152 is made of a suitable material and thickness able to withstand the chemical conditions and internal operating pressures contemplated between the column inlet 153 and outlet 154. Column 152 may be made from a corrosion resistant metal such as stainless steel in one embodiment (e.g. 316 stainless or other). Other materials can be substituted including other metals provided they can withstand the physical and chemical conditions of the process. The material selection does not limit the invention. Chromatography column 152 may be of any suitable diameter, length, material, and configuration may be used depending on the type of material separation to be performed and whether the column is configured for direct packing or to accept removable chromatography cartridges. Columns 152 of either the direct packing or insertable chromatographic cartridge designs are commercially available and well known to those skilled in the art without further elaboration.

Chromatography column 152 may be directly packed with adsorbent stationary phase material 157. Solid adsorbent material particles may be dry packed such as via piston packed directly into the column by any suitable means used in the art in some embodiments. Chromatography column 152 in some embodiments may further include other appurtenances such as one or more fixed frits or movable frits to retain the adsorbent material particles, and also to perform a variety of filtration functions.

Alternatively, in other embodiments column 152 may be configured to removably receive separate insertable and disposable chromatography cartridges pre-packed with the desired adsorption material, such as silica. Such cartridges are generally cylindrical in shape and the internal cavity of the column 152 generally conforms to the diameter and length of the cartridge in a manner well known in the art. Chromatography cartridges are commercially-available from companies such as Applied Separations, Inc. of Allentown, Pa. In one embodiment, disposable cartridges removably useable in columns 150 and 152 are made out of plastic in one embodiment such as polypropylene but could also be made out of any other plastic materials or metal that are configured to fit inside of the column. Embodiments of columns configured for chromatographic cartridges may also include a further sealing mechanism to seal the column-cartridge assembly such as O-rings.

Figure 4:
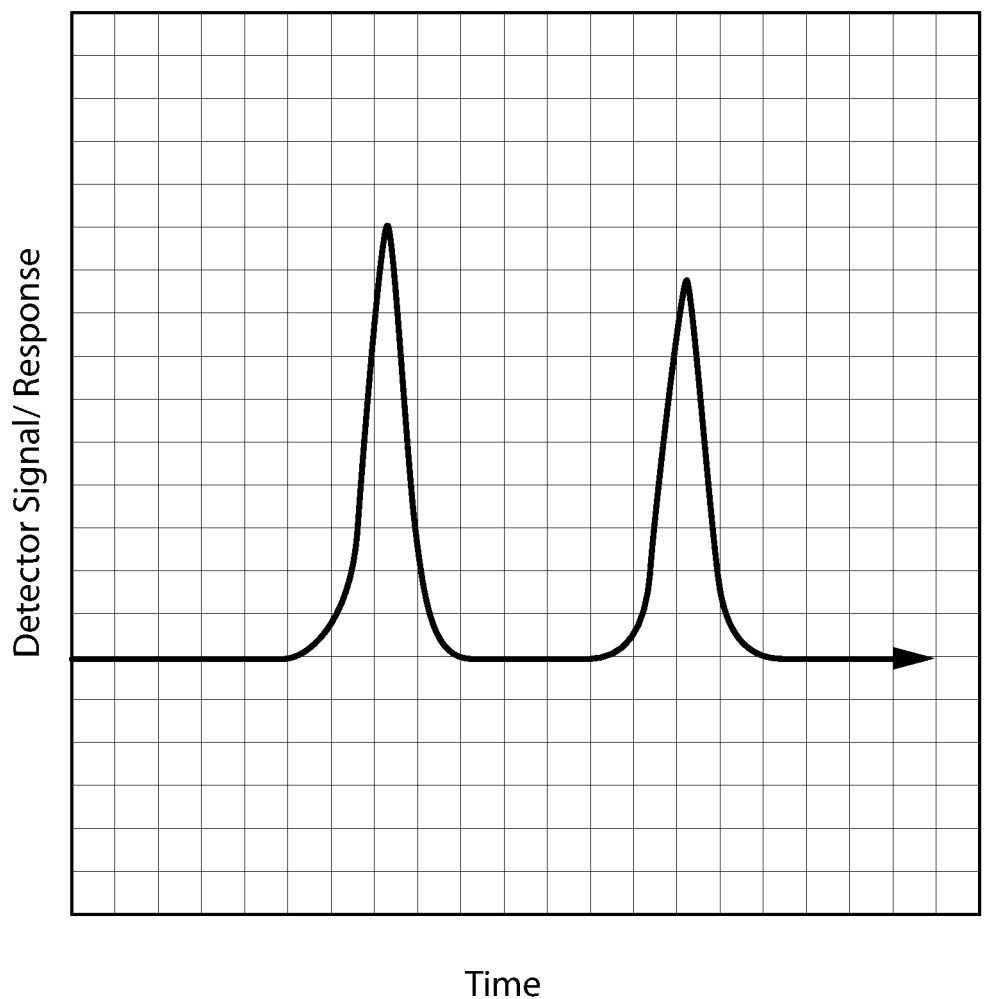
FIG. 4 is a detector chromatogram showing examples of a baseline and separated analytes peak signals.

With continuing reference to FIG. 2, the chromatography process continues with the analyte or eluate from chromatography column 152 (i.e. mobile phase including the separated compound(s) of interest) then passing through a detector 160 operable to detect concentrations of the compounds of interest in the sample which are dissolved in the mobile phase CO2 and the organic solvent mixture. Detector 160 is a liquid chromatography type detector operable to identify the presence of the analyte compound of interest in the liquid CO2 mobile phase. Any suitable detector used in the art for chromatographic separation may be used, such as without limitation ultraviolet, infrared, mass spectroscopy, refractive index, light scattering, chiral, or other types of detectors which are well known to those skilled in the art. In one embodiment, an ultraviolet channel diode array detector may be used. Detector 160 monitors and identifies when peaks are detected in the eluate over time indicating the presence of the compounds of interest, to in turn trigger downstream collection of fraction samples of those compounds. FIG. 4 shows a representative detector chromatogram including a baseline and peaks which indicate the presence of the analyte of interest in the liquid mobile phase from the chromatography column. Detector 160 is communicably and operably connected to the programmable controller 200 via data communication links to provide detection data collected to the controller.

The flow of liquid mobile phase eluate from the detector 160 next passes through a cross fitting 162 where the temperature and pressure of the mobile phase are measured by a pressure sensor 161 and temperature sensor 163. The cross fitting with two lateral side ports facilitates mounting the pressure and temperature sensors; however, other ways for mounting the sensors besides a cross fitting may be used such as individual T-fittings for each sensor mounting location. The temperature and pressure data collected by the sensors 161, 163 may be transmitted to other equipment and/or preferably the controller 200 in some embodiments for monitoring and use by the control system. Controller 200 monitors an actual real-time back pressure P2 on the chromatography column 152 and temperature T1 when running the chromatographic process.

Flow of the eluate next continues to a back pressure regulator (BPR) 170 positioned downstream of chromatographic vessel 152 and detector 160. Any suitable commercially-available BPR may be used. BPR 170 regulates and maintains the modified mobile phase pressure at the desired elution process pressure P2 in the upstream chromatography column 152. The pressure on the downstream side of the BPR is significantly lower than the inlet side which can lead to cooling of the BPR and potentially freezing. Accordingly, in some preferred embodiments, BPR 170 may be heated to compensate for the drop in temperature to prevent freezing of the liquid mobile phase. In some embodiments, temperature of the BPR 170 may be maintained by heating elements from about 0 degrees C. to 100 degrees C., preferably from 20 degrees C. to 50 degrees C.

The set pressure of BPR 170 (i.e. upstream backpressure in chromatography column 152) may be controlled automatically by the controller 171 associated with the BPR, which in some embodiments may be a mechanically controller used to set the spring force of the device. Pressure sensor 161, which may be a separate sensor or integrated with the back pressure regulator, measures the upstream pressure at the outlet of the chromatography column 152 (i.e. elution pressure) ahead of BPR 170. In some embodiments, BPR controller 171 and pressure sensor 161 may further be operably and communicably connected to programmable controller 200 via communication links 112. Therefore, the BPR 170 setpoint pressure (P2) may alternatively be controlled by the controller 200 and monitored by pressure sensor signals transmitted to the controller by sensor 161. In such embodiments, the baseline or setpoint pressure P2 may therefore be preprogrammed into the controller 200. Controller 200 compares the setpoint pressure P2 against the actual back pressure P2 measured by sensor 162 and can adjust the BPR 170 as necessary via controller 171 until the setpoint and actual real-time parameters match.

It will be appreciated that the back pressure regulator 170 is operable and functions to control the elution pressure of modified mobile phase flow in the chromatography column 152 of the chromatography system 100.

Downstream of the back pressure regulator 170, additional liquid organic solvent may optionally be added to the discharge line of the pressure control valve during the initial stages of the chromatographic separation to wash compounds into a first gas liquid separator 180 and then into a fraction collector 190 via a volumetrically smaller second "mini" GLS 192. The liquid organic solvent make-up system if provided may include a solvent make-up pump 124 and a solvent supply such as the same solvent container 121 described herein or a separate make-up solvent container. The make-up pump 124 functions during initial operation of the chromatography system 100 or at other times when the liquid organic solvent feed flow rate from main solvent pump 123 drops below a minimum critical solvent flow rate, such as 10 mL/minute as one non-limiting example. The critical organic solvent flow rate corresponds to the minimum flow rate of liquid organic solvent necessary to carry analytes from the gas-liquid separator 180 to the fraction collector via the mini GLS 192. Under the minimum critical solvent flow rate, eluent aerosolization occurs at low percentages of liquid organic solvent concentrations in the eluent which prevents collection of any solvent in the collection unit (e.g. fractional collector 190) at the terminal end of the process stream. Operation of both the main solvent pump 123 and make-up solvent pump 124 are preferably automatically controlled by programmable controller 200 which adjusts the organic solvent flow from the make-up pump if used so that the combined flow equals at least the critical liquid organic solvent flow rate preprogrammed into the processor 200 at all times during the process. If a make-up pump is not provided, the controller adjusts the main solvent pump flow alone. The make-up solvent flow may be automatically discontinued by the controller 200 when the controller detects that the flow rate from the main solvent pump 123 alone is above the minimum critical solvent flow rate to reduce solvent consumption. Alternatively, an audible and/or visual alert may be provided instead to the user or analyst to manually stop the make-up pump 124.

With continuing reference to FIG. 2, the eluent comprising the liquid mobile phase with analyte next flows to a heater 172. The liquid mobile phase is heated which helps prevent freezing and speeds up and converts the $CO_2$ from single liquid phase into its gaseous phase in downstream in the first gas-liquid separator (GLS) 180. Heater 172 is preferably located upstream and proximate to separator 180 or incorporated into the GLS 180 exterior for separating the gaseous $CO_2$ from the liquid organic mobile phase. In some embodiments, the separator 180 may be a metallic or non-metallic (e.g. polymer) vertically elongated cylindrical tubular element having a top gas outlet 181 and bottom liquid drain outlet 182. The $CO_2$ gas rises and is vented from the separator via the gas outlet. The gas outlet is equipped with a flow restrictor 183. The restrictor may be a valve, or an orifice or a low back pressure regulator or any other type of restriction which can reduce the discharge flow rate of the gas in a controlled manner. The function of the flow restrictor 183 is to reduce the gas flow rate leaving the first GLS. High flow rate of gas results in entrainment of some organic solvent and the analytes with gas leaving the GLS 180. The flow restrictor 183 causes the pressure to increase in GLS 180 and be maintained at the desired pressure. Flow restriction 183 may be configured and dimensioned to produce a pressure in the first GLS 180 in the range from about 0.001 to 10 bar, and more preferably in the range of 0.01-1 bar in one embodiment to minimize entrainment of solvent and analytes. The remaining portion of the liquid mobile phase containing the analyte is discharged from the liquid drain outlet and flows to a second GLS 192 and a collection unit for recovering the separated analytes (compounds or substances of interest), such as without limitation an open table fraction collector 190. The smaller gas-liquid separator mini GLS 192 may be fluidly disposed between the main gas-liquid separator 180 and inlet of the fraction collection 190 to liberate any residual dissolved and entrained gaseous $CO_2$ in the solvent that may carry over from the main separator in the flow conduit 110. The mini GLS may be any vessel that can contain the liquid organic solvent and analytes while allowing draining of the organic solvent and analytes from one orifice and venting of gas from a second orifice. The vent from the second orifice preferably points upwards and is long enough to prevent overflow of liquid from the gas vent. The liberated gas is vented locally via the gas vent associated with the mini GLS 192. GLS 192 operates close to atmospheric pressure versus GLS 180 which operates at a higher pressure caused by the restrictor 183. The inclusion of the mini-GLS ensures smooth collection of the analytes dissolved in the organic solvent without sputtering or bubbling. Importantly, in one embodiment, the vent line from the first GLS 180 has a flow restrictor 183 to increase pressure in GLS 180. The restrictor 183 of the first separator preferably may be sized to cause a back pressure from 0.001 to 10 bar, preferably from about 0.01 to 1 bar. Conversely, the vent line from the mini-GLS is not restricted and has a relatively large diameter. The diameter of the vent may be a 1/16" to 1/4" tube, preferably 1/8" to 1/4" tube. The mini GLS is a small volume vessel; the volume can be from 0.1 ml to 100 ml, preferably from about 1 to 20 ml in some embodiments.

The fraction collector 190 preferably is under computer control by programmable controller 200. The controller causes the fraction collector 190 to automatically direct the liquid mobile phase to either waste or to one or more collection vials or containers based upon peak detection by the detector 160 (see, e.g. FIG. 5) which indicates the presence of the compound of interest in the eluent stream at a given point in time. Any suitable commercially-available fraction collector 190 may be used.

In operation, fraction collection 190 when controlled by controller 200 for automatic operation functions such that when an output signal is received by the collector from controller indicating detector 160 has measured the start of a chromatographic peak (thereby corresponding to the presence of the compounds of interest in the liquid CO2 eluate stream—see, e.g. FIG. 4), the collector directs the eluent flow to a specified vial or chamber. When the detector eluent measurement profile returns to a flat baseline value (indicating primarily the presence of liquid mobile phase alone), the collector 190 is triggered by a control signal output from controller 200 to dump the eluate to a waste container until the next peak is detected. Fractional collectors are configured and operable to perform such functions as peak collection by slope, cutoff, or continuous collection.

The main system programmable controller 200 will now be further described. Controller 200 may be programmed to control operation and data exchange for the entire chromatography process and its components described herein (see, e.g. FIG. 2) by executing appropriately configured software program instructions (e.g. control logic) to form a completely automated system and chromatographic separation process. Various aspects of the controller 200 and its functionality may be implemented in appropriately configured hardware, circuitry, firmware, and/or software. In some embodiments, programmable controller 200 may run commercial software such as for example LabView systems engineering software available from National Instruments which is specially configured to provide the functionally and control aspects of the chromatography system disclosed herein.

The main system programmable controller 200 may be any conventional programmable processor, PLC (programmable logic controller), or computer-based automation system, which may comprise in various implementations for example a data processing and control unit of various types, server, computer, or any device or group of devices and circuitry that may be configured via program instructions (i.e. control logic) to transmit, receive, and/or store data, and generate control signals for automatically controlling operation of the chromatography system. Controller 200 may include one or more processors, which may be connected to a wired and/or wireless communication infrastructure (e.g., a communications bus, cross-over bar, local area network (LAN), or wide area network (WAN)). Processor(s) may be any central processing unit, microprocessor, micro-controller, computational device, or like device that has been programmed to form a special purpose processor for performing the computer functions. In some embodiments, processor(s) may be configured to run a multi-function operating system.

Controller 200 includes all the conventional ancillary devices typically provided for a fully functional PLC or computer-based automation system, including without limitation the processor(s), memory, input/output devices and interfaces, visual displays 204 (including touch screens for data and command entry), wired and/or wireless communication devices and interfaces, etc. One or more printers 202 may be operably connected to controller 200 for printing out the results of the chromatographic separation in graphic and/or text form. Memory provided with controller 200 includes volatile memory and non-volatile memory. Volatile memory may include a local or working memory, such as, random access memory (RAM) while non-volatile memory may be a more persistent memory. Non-volatile memory is used for storing any system related data including programmed baseline operating parameters and actual operating data generated by sensors or other devices that is received by the programmable controller 200, for storing programming instructions used to configure the processor and operation of the chromatography system, and performance results from the chromatographic separation process for further analysis by a user. Examples of non-volatile include, but are not limited to non-transient storage media such as without limitation a hard disk drive(s) and/or removable storage drive(s) such as a magnetic tape drive, an optical disk drive, or other. A removable storage drive, if employed, may read from and/or write to a removable storage unit. Removable storage drive unit(s) may be a disk, magnetic tape, CD-ROM, DVD-ROM, optical disk, ZIP™ drive, Blu-Ray disk, USB flash drive, and others, which may be written to and/or read by a removable storage drive. Other removable storage devices and interfaces that allow software and data to be transferred from the removable storage device to a computer may be used.

A conventional PLC or computer based automation system used for controller 200 may further include a communications module or interface that allows software (i.e. program instructions) and data to be exchanged between the controller and devices/equipment of the chromatography system 100 or other external devices (e.g. laptops, notebooks, cell phones, tablets, etc.) via wired and/or wireless data communication links 112. The communication module thus enables the controller 200 to communicate in a wired or wireless manner with these devices/equipment directly or over a wide area network. Any suitable wired or wireless communication protocols or standards may be used. Non-limiting examples of wired and wireless communications modules or interfaces may include a modem, a network interface (such as an Ethernet or wireless network card), a communications port, a Personal Computer Memory Card International Association (PCMCIA) slot and card, Bluetooth® transceivers, wireless adapters, or others. Software and data transferred via a communications module or interface and control signals may be in the form of signals which may be electronic, electromagnetic, optical, infrared, or any other signal capable of being received by the communications interface. These signals are provided to the communications interface via a communications path or channel. The path or channel that carries the signals may be implemented using wire or cable, fiber optics, a telephone line, a cellular link, a radio frequency (RF) link, Bluetooth®, near field, or the like.

It will be understood that operation and control aspects of the present invention may therefore be embodied in the form of computer-implemented processes and apparatus for practicing those processes. Aspects of the present invention with respect to software comprised of processor/computer program instructions or control logic configured to control operation of chromatography system 100 and the components/processes described herein may be embodied in tangible computer readable non-transitory storage media encoded with computer program code or instructions, such as random access memory (RAM), read only memories (ROMs), CD-ROMs, ZIP™ drives, Blu-Ray disks, hard disk drives, flash memories, USB drives, or any other machine-readable storage medium, such that when the computer program code is loaded into and executed by a computer, the computer becomes a particular machine for practicing the invention. When implemented on a general-purpose processor, the computer program code segments configure the processor to create specific logic circuits. The invention may alternatively be embodied in a digital signal processor formed of application specific integrated circuits (ASICs) for performing a method according to the principles of the invention.

The system programmable controller 200 should therefore be broadly construed to include any of the foregoing electronic devices and processor system related components that automatically control one or more functional aspects of the chromatography system described herein. The foregoing controllers or processors are well known in the art. It is well within the ambit of those skilled in the art to therefore select and provide a suitable controller or processor programmed to provide the required functionality described herein.

Figure 5:
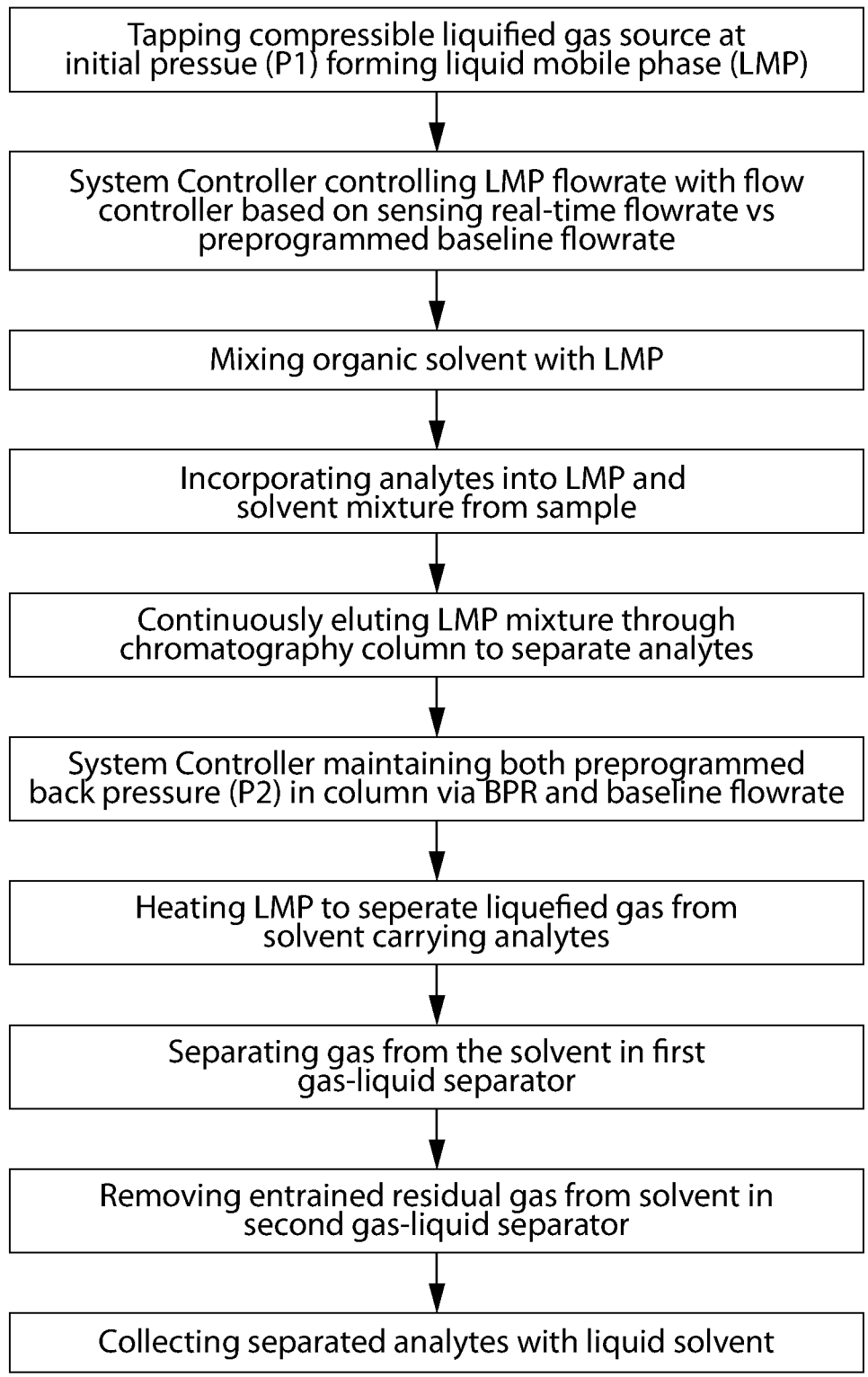
FIG. 5 is a flow chart of a chromatographic separation process or method according to the present disclosure which is controlled by a programmable controller.

Operation of the chromatography system 100 according to the present disclosure will now be briefly described in the following example method or process with initial reference to FIG. 2. FIG. 5 is flowchart summarizing the basic steps involved in this non-limiting method or process, which are described in greater detail below.

During initial system setup, an analyst or user initially enters and programs the description of the sample and chromatography conditions of time, liquid CO2 flowrate/gradient, organic solvent flowrate/gradient, mobile phase pressure, temperatures of the heated back pressure control regulator 170 pressure set-point and post heater 172 set point, UV detector wavelength range for analysis, and slope/level peak detection and collection of fractions into programmable controller 200 via an input device, such as for example a keyboard and/or touch screen associated with the controller. Routine chromatographic programs and parameters can be saved and recalled in memory of the controller (non-volatile) or removable storage devices described herein. In this example, the house supply line pressure P1 is assumed to be 80 bar and the chromatography system liquid mobile phase pressure to be maintained in the chromatography vessel 152 (i.e. back pressure) is set at 65 bar in the computer. The process may operate at an ambient room temperature of 20 degrees C. (68 F) in this example with no interventional cooling of the liquid CO2.

Next, the user adds a sample to the sample column or vessel 150 containing the mixture of analytes of interest. The sample may be added to the sample vessel 150 in several ways. The sample can be added to the top of a sample vessel filled with chromatographic media or to the top of a chromatographic cartridge that is placed inside a sample vessel. The sample vessel is then attached to the high pressure liquefied-gas chromatograph vessel or column 152 via finger tight fittings. Alternately in some embodiments, the sample can be mixed with chromatographic sorbent and packed into the chromatography vessel or column 152 or mixed with chromatographic sorbent and packed into a cartridge that is placed in the chromatography vessel.

The initial equilibration process is now ready to be started. This ensures that the liquid mobile phase reaches steady state operating conditions before the sample chromatographic separation process is started. Liquified CO2 (mobile phase) from an available laboratory or process facility "house" supply line source 120, which in this non-limiting example may be about 80 bar (P1), is tapped and supplied to the high pressure liquefied-gas chromatography system 100.

The programmable controller 200 may begin operation by performing preliminary actions or steps including: 1) Initializing the chromatography system 100 for operation; 2) Setting equipment status to "On" to activate the components described herein; 3) Opening the Analysis Module to initialize the liquid organic solvent pump and fraction collector; 4) Initializing the detector 160; 5) Send preprogrammed operating temperature setpoint to post heater 172; 6) Waiting for post heater 172 to warm up to setpoint temperature determined via temperature sensors on the heater which measure and transmit real-time temperatures to the controller; 7) Waiting for the detector 160 to warm up to preprogrammed baseline or setpoint temperatures via temperature sensors on the detector which measure and transmit real-time temperatures to the controller; 8) Configuring the 3-Way selector valve 144 to activate the bypass flow path or operating mode to bypass the sample vessel 150; and 9) Sending CO2 setpoint flowrate to flow control metering valve 130 via valve controller 131 and chromatography column 152 setpoint pressure P2 to back pressure controller 170 via controller 171. These controllers will automatically adjust the operating position of valve 130 and regulator 170 to match the actual operating CO2 flowrate and pressure P2 to the setpoint values transmitted by the controller 200 to the valve and regulator.

With the liquid mobile phase flow path established, the liquified gas (CO2) passes from the liquid CO2 source 120 and across the flow control valve 130 and flowmeter 140 of flow controller 250. The pressure on the discharge side of the flow controller is preferably maintained at approximately 65 bar (P2), which is controlled by the back pressure regulator 170 via programmable controller 200 in this non-limiting example; this setpoint pressure being previously preprogrammed into the controller 200 by the user. The liquid CO2 control valve is automatically controlled by programmable controller 200 during the entire process to regulate the flow rate/gradient of liquid CO2 to be supplied to the chromatograph (chromatography vessel 152) and produce pressure P2 of the CO2 in the system. The controller 200 transmits control signals to the flow control metering valve controller 131 which adjusts the position of the valve to produce the desired flow rate. The controller 200 automatically controls and adjusts the position of the metering valve 130 by comparing the actual real-time flowrate measured by flowmeter 140 with preprogrammed baseline or setpoint flowrates to ensure the flowrates match. As already noted herein, this unique equipment configuration advantageously eliminates the necessity to use an expensive high pressure liquid CO2 pump and chiller such as those found in SFC systems to control the flow rate of the liquified gas. In this example, the flow rate of liquid CO2 to achieve rapid chromatographic separation of the sample may be about 60 mL/minute; however, other suitable flowrates may be course be used.

Figure 6:
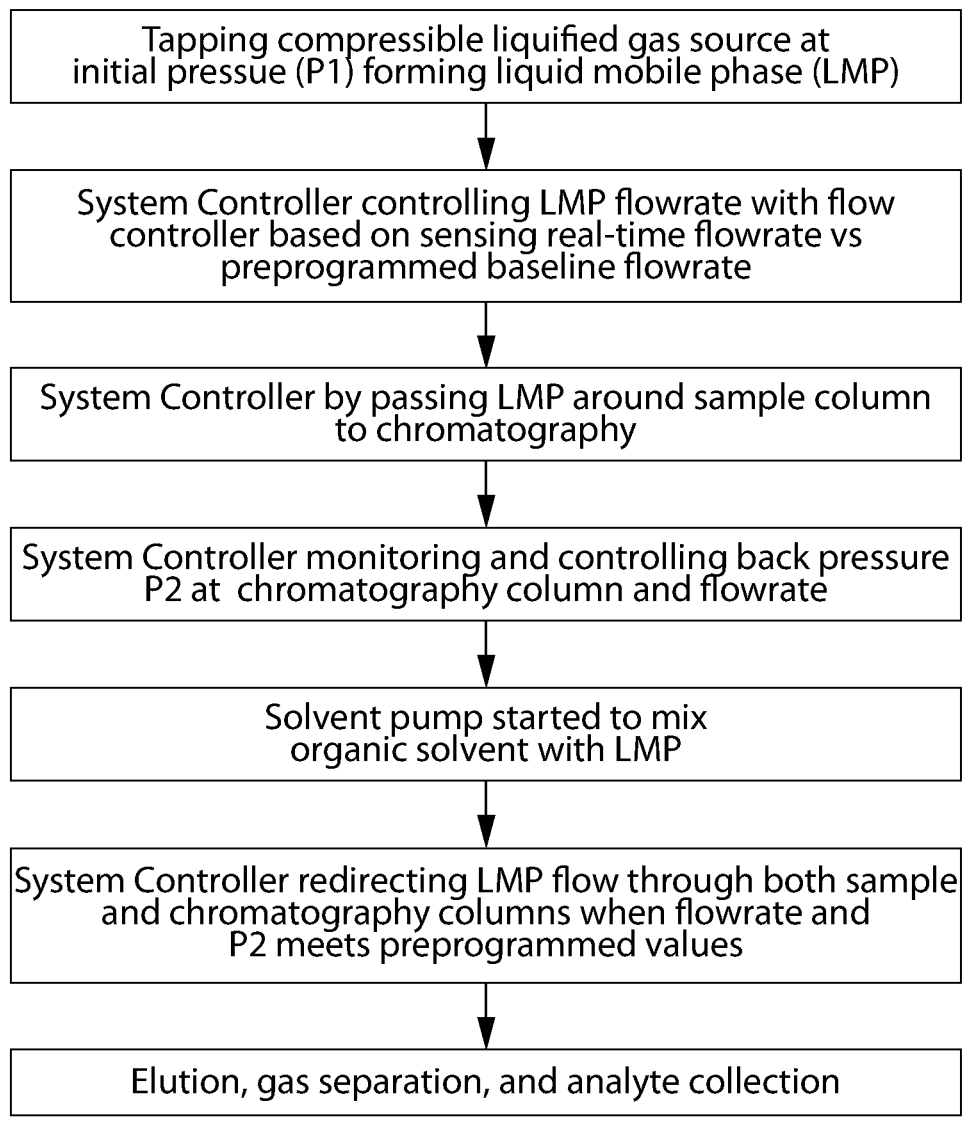
FIG. 6 is a flow chart of a process or method for equilibrating the chromatography system of the present disclosure prior to separation of analytes in the chromatography column.

Liquified CO2 (liquid mobile phase) is then metered and flows at the desired preprogrammed baseline flowrate from flow control metering valve 130 of flow controller 250 to a mixing element 142 and proceeds to the 3-way switching or selector valve 144. The mixer 142 may be heated in some embodiments to prevent freezing of all or part of the liquid mobile phase. The selector valve 144 is operated and configured by controller 200 to create the flow path between its single inlet 2 and one of the dual outlet ports (i.e. port 1)

necessary to activate the bypass flow path or operating mode in the manner previously described herein. FIG. 6 is a flow chart which summarizes equilibration bypass steps implemented in the chromatography system 100 prior to separation of analytes in the chromatography column 152. It bears noting that in one implementation of the process, the solvent pump 123 may not be started to save solvent.

With the bypass activated, the liquified gas flow bypasses the sample vessel or column 150 for now flowing through valve outlet port 1 through the bypass flow conduit 151. The liquified gas then flows directly into the chromatography vessel 152 that is packed with the chromatographic sorbent. The liquified gas mobile phase passes through the chromatography vessel and into UV detector 160, and then through flow cross 162 where the temperature T1 and pressure P2 of the mobile phase downstream of the chromatograph are measured by sensors 161 and 163. Next, the liquified gas mobile phase passes through heated back pressure regulator 170 that regulates the mobile phase back pressure at 65 bar in the chromatography column 152. The controller 200 may simultaneously regulate and automatically balance the position of both the flow control metering valve 130 of flow controller 250 and back pressure regulator 170 in tandem to produce both the desired system elution pressure and flowrate of the liquid mobile phase in the chromatography vessel 152 for the sample separation. Programmable controller 200 controls the position (percent open/closed) of valve 130 by transmitting control signals to valve controller 131 operably coupled to the valve. Similarly, controller 200 controls the back pressure P2 maintained by BPR 170 by transmitting control signals to integrated BPR controller 171.

It bears noting that the liquid mobile phase pressure right after the flow control valve 130 and flowmeter 140 downstream of the valve will be somewhat higher than the back pressure P2 (e.g. 65 bar) on chromatography column 152 because the flow must overcome the pressure drop through the balance of the system including chromatography column 152. For example, tests have indicated that the pressure drop across the detector 160 is about 2 bar. Pressure drop across the column 152 is estimated to be about 10 bar. Accordingly, the system pressure just downstream of the flow meter 140 would be equal to or greater than about 77 bar in one embodiment.

The mobile phase leaving the back pressure regulator 170 starts depressurizing as it passes the post heater 172, and then into the first gas-liquid separator 180 and into the second mini gas liquid separator 192 operating at atmospheric pressure. The liquified CO2 entering the first gasliquid separator is at a low pressure is now a gas and exits the gas-liquid separator through the gas vent top outlet 181 of the separator via the restrictor 183. This operation continues until the pressure, and flow rate of the liquified gas is stabilized to the programmed conditions. Controller 200 monitors this equilibration process and receives actual liquid mobile phase data sensed by the system including pressure P2, temperature T1, and flow rate (mL/min) via data transmitted from flowmeter 140. The equilibration continues until the controller 200 determines that the pressure, and flow rate of the liquid CO2 is stabilized by comparing the actual real-time sensed data to corresponding intended baseline operating conditions or setpoints for each of these parameters previously preprogrammed into the controller by the user. When the actual data satisfies or reaches the baseline values, the chromatography system is considered equilibrated by the controller 200 and ready for separating the same.

After the liquified gas mobile phase is stabilized for pressure and flow rate (i.e. equilibrated), the controller 200 may be programmed to then automatically change position of selector valve 144 to close the bypass 151 flow circuit and instead now activate the normal flow path or operating mode using ports 2 and 3 by transmitting control signals to the selector valve's controller. In other embodiments, the controller may instead provide an audible and/or visible alert to the user or analyst to allow operating mode of valve 144 to be switched manually (either via the controller using a user input device such as a keyboard or touchscreen, or at the valve itself). The liquid organic solvent pump 123 is now started by the controller and the incompressible organic solvent is mixed with the liquified gas mobile phase at the mixing tee 142. The combined liquid CO2 and organic solvent mobile phase (which may also be referred to as a "modified" liquid mobile phase) flows through the sample vessel 150 under computer control of processor 200. Compounds in the sample vessel that are soluble in the mobile phase are dissolved in the mobile phase and proceed to the chromatography column 152 where separation of the components occurs. The controller 200 automatically adjusts the individual flowrates of the liquid CO2 and organic solvent to meet the preprogrammed total or combined binary liquid mobile phase flowrate desired for the chromatographic separation. In one non-limiting example, the total binary liquid mobile phase flowrate may be 60 ml/min. The flow of the solvent may be isocratic or gradient, and therefore varied over a period time during the course of the elution, as discussed elsewhere herein. The mobile phase composition thus can be programmed via the controller 200 for isocratic or gradient elution of compounds from the chromatography vessel. The mobile phase composition can be changed from 100% liquefied CO2 gas to 100% organic solvent and still maintain a single miscible liquid phase at 65 bar and room temperature. Separated compounds from the chromatography column 152 are detected by the UV detector 160 downstream of the chromatography column 152 and pass through the heated back pressure regulator 170.

Additional liquid organic solvent may optionally be added to the discharge line of the pressure control regulator 170 during the initial stages of the chromatographic separation by the solvent make-up system described herein to facilitate washing compounds into the first larger gas-liquid separator 180 and then through the smaller second gas-liquid separator 192 to remove any dissolved gas which may be entrained in the solvent and analyte liquid mixture. Flow proceeds to fraction collector 190 where each of the analytes are collected at different times during the elution process. The fraction collector under control of programmable controller 200 can direct the solvent to waste when no analytes are detected by detector 160, or alternatively to one of the collection vials based upon chromatographic peak detection described herein to isolate the analyte. It bears noting that the liquid mobile phase flow is continuous during the separation process and the analytes are eluted from the column at different times.

After the chromatography run is finished and analyte separation/collection is complete, the mobile phase is again directed around the sample vessel 150 in bypass mode via controller 200 and into the chromatography column 152 in the same manner previously described. The organic solvent pump 123 is stopped and liquified CO2 gas continues to flush the chromatography vessel of residual solvent. After the chromatography vessel has been flushed, the liquified gas chromatograph is automatically depressurized using controller 200 to close the liquid CO2 flow control valve 130 and opening the back pressure regulator 170 to reduce pressure to atmosphere. A report and chromatogram is automatically generated by the programmable controller 200 detailing sample and separation information for the user.

In another embodiment, only the sample vessel 150 is depressurized using vent valve 148 to allow removal of the processed sample and insertion of the next sample. Selector valve 144 outlet port 1 is opened, thereby closing outlet port 3 leading to the sample vessel 150. The chromatography vessel may now optionally be equilibrated for the next chromatographic run simultaneously by operating the three-way valve 144 in bypass mode. This technique allows for the concurrent changing of the sample while equilibrating the chromatography column.

Programmable controller 200 may be preprogrammed with various baseline or setpoint operating sample run parameters for conducting the chromatographic sample processing run. The controller 200 automatically adjusts operation of the system 100 and various components as described herein to ensure that the actual real-time flowrates, pressures, temperatures, or other baseline run parameters conform to the run input parameters. Examples of the baseline run parameters that may be used include without limitation post heater 172 temperature, back pressure regulator 170 heater temperature, starting and ending liquified CO2 flowrate measured by flowmeter 140 and controlled by the flow control metering valve 130, liquid mobile phase flow duration time, elution processing run duration time, liquid CO2 (liquid mobile phase) back pressure P2 at chromatography column 152 controlled by back pressure regulator 170, main solvent flowrate controlled by solvent pump 123, make-up solvent flowrate controlled by make-up solvent pump 124 (if optionally provided), and others. These run parameters may be displayed on the visual display device (screen or monitor) and input by the user via the input interface provided (e.g. keyboard, touchscreen, etc.).

Testing

Test runs were performed to ascertain the scalability of the present single phase liquid CO2 chromatography system and compare performance with traditional SFC systems.

It was found that the compressible liquid CO2 chromatography separation process disclosed herein advantageously provides comparable chromatographic separation selectivity to traditional HPLC systems with less solvent usage, and without the high equipment costs of high pressure SFC systems (i.e. high pressure pumps, chillers, and very high pressure vessels). The liquified CO2 results further unexpectedly showed comparable scaleup predictability of compound elution order when compared to compound elution order using silica thin-layer chromatography (TLC) conditions. TLC is the regularly used method in the art to predict separation performance and compound elution order for scaling up to HPLC chromatography using only liquid organic solvents. Scaleup from TLC to supercritical fluid chromatography has shown changes in the compound elution order and is not reliable. In summary, the testing demonstrates the predictability, performance, and cost-effectiveness of the present single phase compressible liquid chromatography system thereby providing a greener chromatographic separation alternative to conventional chromatography systems.

Another advantage of the compressible liquid CO2 chromatography separation process disclosed herein is quicker separation of the sample analytes from the mobile phase than low pressure liquid chromatography (LPLC) using incompressible solvents which is respectively slower and longer. Using compressible solvents according to the present disclosure, the time required to evaporate the solvent from the sample is greatly reduced, generally proportional to the amount of compressible fluid used to make up the mobile phase. The reason for this is that under standard conditions (temperature and pressure), the compressible CO2 solvent quickly reverts to a gas, thereby speeding the sample evaporation and concentration process.

Further advantages are possible using the compressible liquid CO2 chromatography separation process disclosed herein. MPLC (medium pressure liquid chromatography), LPLC described above, HPLC (high performance liquid chromatography) using high pressure, and UHPLC (Ultra High Pressure Liquid Chromatography) are all performed using incompressible liquid solvents. Supercritical fluid chromatography (SFC) is a high pressure process using compressible fluids such as CO2 as already described herein. The surface tension of supercritical CO2 is zero by definition. By contrast, the surface tension of the solvents used in incompressible liquid chromatography (MPLC, LPLC, HPLC, UHPLC) typically can range from 20 to 50 dynes/cm. SFC results in results in faster separation times in contrast to the foregoing incompressible liquid chromatography due to the higher surface tensions of their incompressible fluids.

Advantageously, the surface tension of liquid CO2 used in embodiments of the chromatography system and process according to the present disclosure is approximately 1.5 dynes per cm which is nearer that of SFC, and significantly lower than incompressible liquid chromatography (MPLC, LPLC, HPLC, UHPLC) described above. Compressible CO2 liquid chromatography according to embodiments of the present invention therefore offers most of the benefits of SFC (i.e. very low surface tension with corresponding faster sample recovery speeds), but at a significantly reduced cost of system ownership than SFC due to the low pressure component design, more similar to incompressible liquid chromatography.

The compressible liquid CO2 chromatography separation process disclosed herein can be readily employed in the laboratory setting and is scalable for industrial separation applications. In addition, although the compressible liquid CO2 chromatography separation process disclosed herein is described with respect to using CO2 as the mobile phase, the present process can use other suitable compressible fluids adapted for chromatographic separations.

While the foregoing description and drawings represent exemplary embodiments of the present disclosure, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes. One skilled in the art will further appreciate that the embodiments may be used with many modifications of structure, arrangement, proportions, sizes, materials, and components and otherwise, used in the practice of the disclosure, which are particularly adapted to specific environments and operative requirements without departing from the principles described herein. The presently disclosed embodiments are therefore to be considered in all respects as illustrative and not restrictive. The appended claims should be construed broadly, to include other variants and embodiments of the disclosure, which may be made by those skilled in the art without departing from the scope and range of equivalents.

What is claimed is:

1. A method for separating a sample using single-phase high pressure liquified gas chromatography, the method comprising:
    tapping a source of liquified compressible gas at an available first pressure to form a liquid mobile phase;
    flowing the liquid mobile phase through a flow controller configured for regulating a flowrate of the liquid mobile phase;
    measuring a real-time flowrate of the liquid mobile phase through the flow controller using a flowmeter;
    controlling the flowrate of the liquid gas mobile phase through the flow controller with a programmable controller based on the controller sensing the real-time flowrate measured by the flowmeter;
    mixing a miscible liquid organic solvent with the liquid mobile phase to form a modified liquid mobile phase existing as a single phase liquid;
    incorporating analytes of interest into the modified liquid mobile phase;
    eluting the modified liquid mobile phase through a chromatography vessel containing an adsorption material operable to separate the analytes from the liquid mobile phase;
    maintaining a lower preselected minimum second pressure in the chromatography vessel during elution preprogrammed into the controller to prevent separation of the modified liquid mobile phase into mixed liquid and gas phases in the chromatographic vessel, the controller automatically adjusting a back pressure regulator downstream of the chromatography vessel to maintain the minimum second pressure;
    heating the modified liquid mobile phase containing the separated analytes to separate the liquified compressible gas from the liquid organic solvent containing the separated analytes, the modified liquid mobile phase comprising a volumetric majority of gas and a lesser volumetric minority of liquid comprising the organic solvent and a residual amount of the liquid mobile phase in the form of dissolved gas;
    separating the gas from the liquid in a first gas-liquid separator; and
    collecting the separated analytes along with the liquid organic solvent;
    wherein the incorporating step comprises flowing the liquid mobile phase through a sample column containing the analytes; and
    further comprising steps of:
    before flowing the liquid mobile phase through the sample column, initially bypassing the sample column and flowing the liquid mobile phase from the flow controller directly to and through the chromatography vessel;
    equilibrating the liquid mobile phase for a period of time until a real-time temperature, a real-time pressure downstream of the chromatography column, and the real-time flow rate of the liquid mobile phase monitored by the processor is stabilized by reaching predetermined baseline parameters for each of the foregoing parameters preprogrammed into the controller;
    cease bypassing the sample column by redirecting flow of the liquid mobile phase through the sample column.

2. The method according to claim 1, wherein the flowmeter measures and transmits a liquified gas mobile phase real-time flowrate to the controller, the controller automatically adjusting the flow controller to maintain a preselected flowrate preprogrammed into the controller based on comparing the real-time flowrate to the preselected flowrate.

3. The method according to claim 2, further comprising a pressure sensor configured and operable to measure and transmit a modified liquid mobile phase real-time pressure to the controller, the controller automatically adjusting the back pressure regulator to maintain the preselected minimum second pressure based on comparing the measured real-time pressure to the preselected minimum second pressure.

4. The method according to claim 3, wherein the controller automatically adjusts the back pressure regulator simultaneously in tandem with the flow controller to balance and maintain both the preselected minimum second pressure in the chromatographic vessel and the preselected flowrate of the liquid mobile phase.

5. The method according to claim 1, wherein the modified liquid mobile phase is maintained as the single phase liquid in the chromatography vessel during elution based on the preselected minimum second pressure and an operating temperature of the liquid mobile phase without interventional cooling of the liquid mobile phase between the source of liquified compressible gas and the chromatography vessel.

6. The method according to claim 1, further comprising after the separating step, an additional step of removing and venting the residual amount of the liquid mobile phase in dissolved gas form from the liquid organic solvent in a second gas-liquid separator downstream of the first gas-liquid separator.

7. The method according to claim 6, wherein the second gas-liquid separator has a smaller volumetric capacity than the first gas-liquid separator.

8. The method according to claim 6, wherein the second gas-liquid separator receives an effluent from the first gas-liquid separator which comprises a minority of dissolved gas and a majority of liquid comprising mostly the organic solvent.

9. The method according to claim 1, wherein the elution is performed at an ambient room temperature below critical temperatures of both the liquified compressible gas and the organic solvent to maintain the modified liquid mobile phase in a liquid state.

10. The method according to claim 9, wherein the ambient room temperature is below 31 degrees Celsius.

11. The method according to claim 10, wherein the preselected minimum second pressure is about 65 bar.

12. The method according to claim 9, wherein the first pressure of the liquified compressible gas is about 80 bar.

13. The method according to claim 1, wherein the liquified compressible gas is carbon dioxide.

14. The method according to claim 1, further comprising a selector valve operably coupled to the controller, the controller operable to change the selector valve between: (1) a first position in which the liquid mobile phase flows through the sample vessel and into the chromatography vessel for analytes separation; and (2) a second operating position in which the liquid mobile phase bypasses the sample vessel and flows directly into the chromatography vessel for initial equilibration of the system.

15. The method according to claim 1, wherein the flow controller is a single device incorporating an adjustable flow control valve, a valve controller operably coupled to the flow controller and configured to adjust position of the valve between a closed position and a plurality of open positions, and the flowmeter operably coupled to the flow controller.

16. The method according to claim 1, wherein the back pressure regulator is heated to prevent freezing of all or part of the modified liquid mobile phase.

17. A method for separating a sample using high pressure liquid chromatography with a liquefied gas mobile phase, the method comprising:
   tapping a source of compressed liquefied gas at an available first pressure to form a liquid mobile phase;
   flowing the liquid mobile phase through an automated flow controller at a programmable controlled flow rate;
   mixing a miscible liquid organic solvent at a programmable controlled flow rate with the liquid mobile phase to form a modified liquid mobile phase existing in a single liquid phase;
   incorporating a sample containing a mixture of analytes into the modified liquid mobile phase;
   eluting the modified liquid mobile phase and sample through a chromatography vessel containing an adsorption material to separate the analytes from each other in the sample;
   maintaining a programmable minimum second pressure of the modified liquid mobile phase in the chromatography vessel during elution via an automated back pressure regulator downstream of the chromatography vessel, the minimum second pressure being lower than the first pressure and selected to maintain a preselected flowrate of the modified liquid mobile phase through the chromatography vessel while also maintaining the modified liquid mobile phase in the miscible complete liquid state;
   heating the modified liquid mobile phase containing the separated analytes in order to separate the liquefied gas from the liquid organic solvent containing the separated analytes in a first gas-liquid separator;
   additionally removing and venting residual dissolved gas from the liquid organic solvent in a second gas-liquid separator; and
   collecting the separated analytes along with the liquid organic solvent in multiple collection chambers.

18. The method according to claim 17, wherein the second gas-liquid separator has a smaller volumetric capacity than the first gas-liquid separator.

* * * * *